UNITED STATES PATENT OFFICE.

PAUL A. DODÉ, OF RHEIMS, ASSIGNOR TO THE SOCIÉTÉ FRANCAISE D'IN-OXYDATION ET DE PLATINAGE, OF PARIS, FRANCE.

GILDING METALS.

SPECIFICATION forming part of Letters Patent No. 255,421, dated March 28, 1882.

Application filed April 5, 1880. (Specimens.) Patented in France May 21, 1879.

*To all whom it may concern:*

Be it known that I, PAUL ALEXANDRE DODÉ, of Rheims, France, have invented Improvements in Gilding Metals; and I do hereby declare that the following is a full, clear, and exact description of the same, and that I have obtained Letters Patent of France for fifteen years, dated May 21, 1879, numbered 130,799, for said invention.

My invention consists in coating metals with a very light but very strong covering of gold, presenting a very rich appearance, a bright or lustrous surface being obtained without having recourse to burnishing.

*Composition No. 1.*—I dissolve one kilogram of pure alum in just sufficient water for solution. After it is completely dissolved I pour one liter of ammonia, (alkali,) whereby the alum is præciptated in the form a very thick jelly. This precipitate is then placed on a filter in order to drain off as much of the water as possible. The alum is then put into a porcelain capsule, and I add five hundred grams of nitric acid, which has the property of redissolving the alum. I then dissolve in another capsule one hundred and fifty grams of carbonate of cobalt in two hundred grams of nitric acid. I assist the solution by the gentle heat of a sand bath. When the solution is complete I pour it upon the alum solution. The whole being well mixed, I completely evaporate the acids by placing the capsule in a highly-heated sand bath. I collect and pound the composition and calcine it in a crucible over a strong fire before employing it in the following composition.

*Composition No. 2.*—I melt the following composition, well mixed together in a crucible, over a quick fire:

|  | Kilograms. | Grams. |
|---|---|---|
| Product No. 1 |  | 600 |
| Red lead | 3 | 200 |
| Boracic acid |  | 800 |
| Finely-pulverized white glass. |  | 200 |
|  | 4 | 800 |

When melted I run the composition into cold water. I dry and then grind the composition by the processes now employed for grinding enamels. The composition is ground up with spirits of turpentine, and it should be ground as fine as possible in order to facilitate its employment. If too thick, a suitable quantity of turpentine is added.

*Composition No. 3.*—I dissolve in a porcelain capsule, pure gold, one hundred grams; muriatic acid, two hundred grams; nitric acid, one hundred grams. I assist the solution by the moderate heat of a sand bath, and I then add two grams of pure tin and two grams of arsenious acid. I then evaporate about one-half of the acids. I let cool and add one hundred and fifty grams of distilled water. The solution is put on one side and the following operation proceeded with:

*Composition No. 4.*—I put in a glass matrass one hundred and fifty grams of turpentine balsam of sulphur containing twenty per cent. of sulphur (such as prepared by all druggists;) forty grams of Venice turpentine; two hundred grams of essential oil of lavender. I heat in a sand bath until the liquid has attained a deep-red color. At this point I remove from the fire and let cool. After cooling I pour the whole into a porcelain capsule, and then pour in product No. 3 very slowly, taking care to well stir continually the composition No. 4 with a glass spatula. In this operation I employ assistance for pouring and stirring, as it is very difficult to pour slowly with one hand and stir well with the other. When No. 3 is poured in there forms in capsule No. 4 a material of a very rich brown color, and which becomes very thick. If the desired tint does not at once appear, I slightly heat the matter, continuing the stirring all the while, and withdraw it from the fire directly I perceive the change of color takes place, whereupon I allow it to cool, as the gold has now left the acids. After cooling I remove the acids as carefully as possible and let stand until the next day. I then again remove any little acid which may have separated from the composition, and then without troubling myself about any it may still contain I pour upon it, drop by drop, taking care to stir well the while, and so long as any reaction can be perceived, fifty grams of ammonia, (alkali.) This quantity is not always necessary. The mixture is very readily effected, and I allow it to rest for two hours, after which I pour in three hundred grams of essential oil of lavender. I heat slightly in order to mix thoroughly, and then let cool. I then filter the composition through paper, which I take care to immerse in essential oil of lavender in order to render it impervious to water. The auriferous liquor passes through, while the ammoniacal water remains on the filter. The composition so obtained is ready for use on leaving the filter.

Many other processes for obtaining gold in this form have been described and applied to porcelain, pottery, and glassware; but they are not suitable for application to metals. I have been obliged, after trying them, to return to my own formula, by means of which I insure application of bright gilding without polishing or burnishing, or of mat-gilding on metals by means of baths or the application with a brush of gold, either alloyed or pure, held in suspension or solution.

For bright gilding on wrought or cast iron, copper, and other metals, I proceed as follows: The articles to be gilded should be very clean—that is to say, free from oxidation or foreign matters. The articles in this condition are slightly heated to remove moisture, and I then proceed by dipping a brush in composition No. 2 and coating the articles therewith, taking care to apply to all parts a sufficiently thick coat, which should be about as thick as a rather deep coat of oil-paint. The articles thus coated are placed in a cupboard to shelter them from dust, and left for a few hours to dry, after which they are heated in a muffle similar to that employed by enamelers, or of a size suited to that of the articles to be operated on. On leaving the muffle the articles present brilliant blue-black aspects. When cooled the articles thus treated are ready for gilding, which is effected by dipping a brush in the gold-liquor, No. 4, and applying a very bright and very even coat of it to the articles. I then allow them to dry for a few hours in a situation sheltered from dust, after which I proceed to heat the gold in the same manner as for product No. 2, taking care to heat them slowly in order to prevent the blistering of the gold layer. The transformation is then seen to take place, the articles passing from the black tint to a brilliant yellow, and at this moment they should be removed from the muffle. The beauty and solidity of this gilding will be at once apparent, it being much superior to electro or mercurial gilding.

For mat gilding it is only necessary that the coating of No. 2 should be very thin in order that it may remain mat, as the luster is only due to the thickness of the layer. As the articles remain mat, the gilding will be also mat.

If desired to obtain bright gilding without using composition No. 2, it may be done by polishing the articles beforehand, either by hand-tools or in a lathe, in the ordinary way. The gold applied to polished metals is also brilliant; but it requires to be laid on much thicker in the case of cast-iron on account of its porosity. A mat surface may be similarly produced upon the metal direct; but it is always preferable to use composition No. 2, as much less gold is required than when applied to the metal direct.

It will be seen from the foregoing that the process is at once simple and economical.

I claim—

1. The process of bright or mat gilding wrought and cast iron and other metals by first covering the said metals with a preparatory enamel, and then with a mixture of gold, muriatic acid, nitric acid, tin, arsenious acid turpentine, balsam of sulphur turpentine, and essential oil, substantially as specified.

2. The composition herein described for surface-coating metals preparatory to gilding them, consisting of a mixture of glass, boracic acid, and red lead combined with a calcined mixture of alum, ammonia, nitric acid, and carbonate of cobalt, substantially as specified.

PAUL ALEXANDRE DODÉ.

Witnesses:
   K. CHOMOR,
   A. SCRIBBLE.